(12) United States Patent
Jeong

(10) Patent No.: US 11,778,988 B2
(45) Date of Patent: Oct. 10, 2023

(54) AUTOMATIC BEE SEPARATION DEVICE

(71) Applicant: Hyuk Jeong, Gwangju (KR)

(72) Inventor: Hyuk Jeong, Gwangju (KR)

(*) Notice: Subject to any disclaimer, the term of this patent is extended or adjusted under 35 U.S.C. 154(b) by 0 days.

(21) Appl. No.: 17/426,708

(22) PCT Filed: Sep. 21, 2020

(86) PCT No.: PCT/KR2020/012691
§ 371 (c)(1),
(2) Date: Jul. 29, 2021

(87) PCT Pub. No.: WO2021/054795
PCT Pub. Date: Mar. 25, 2021

(65) Prior Publication Data
US 2022/0201986 A1    Jun. 30, 2022

(30) Foreign Application Priority Data
Sep. 20, 2019  (KR) .................. 10-2019-0116107

(51) Int. Cl.
*A01K 47/06*  (2006.01)
*A01K 59/00*  (2006.01)

(52) U.S. Cl.
CPC .............. *A01K 47/06* (2013.01); *A01K 59/00* (2013.01)

(58) Field of Classification Search
CPC ......... A01K 51/00; A01K 59/00; A01K 47/06
USPC ......................................... 448/50–52, 5, 35
See application file for complete search history.

(56) References Cited

U.S. PATENT DOCUMENTS

| 4,288,880 A * | 9/1981 | Gary .................. A01K 55/00 449/52 |
| 4,520,519 A * | 6/1985 | Kuehl .................. A01K 59/00 449/51 |
| 4,776,051 A | 10/1988 | Syme |
| 6,193,583 B1 * | 2/2001 | Gunness .............. A01K 59/02 449/54 |
| 2016/0000050 A1 * | 1/2016 | Engel .................. A01K 59/04 449/5 |

FOREIGN PATENT DOCUMENTS

CN         105519457 A  *  1/2016
KR   10-2012-0045211       5/2012
(Continued)

*Primary Examiner* — Magdalena Topolski
*Assistant Examiner* — Shada Mohamed Alghailani
(74) *Attorney, Agent, or Firm* — LEX IP MEISTER, PLLC

(57) ABSTRACT

The present invention relates to an automatic bee separation device, and more specifically, to an automatic bee separation device capable of automatically withdrawing a beehive accommodated in a bee box, performing bee separation at the same time, and when the bee separation is completed, inputting the beehive to the bee box. In the automatic bee separation device according to the present invention, since beehive withdrawal work and bee separation work are performed at the same time without requiring a worker to directly and manually withdraw the beehive from the bee box when the bee separation work or honey extraction work is performed after the bee separation work, a speed and efficiency of the work can be maximized in addition to an effect of reducing a labor cost. Therefore, as productivity increases, an effect of increasing income can be generated.

6 Claims, 11 Drawing Sheets

(56) References Cited

FOREIGN PATENT DOCUMENTS

| | | | |
|---|---|---|---|
| KR | 200460083 Y1 * | 5/2012 | |
| KR | 20120129715 A * | 11/2012 | |
| KR | 20140007722 A * | 1/2014 | |
| KR | 10-2014-0059538 | 5/2014 | |
| KR | 200475229 Y1 * | 11/2014 | |
| KR | 20150102497 A * | 9/2015 | |
| KR | 20160101621 A * | 8/2016 | |
| KR | 10-1908051 | 10/2018 | |
| KR | 10-2093334 | 3/2020 | |
| WO | WO-0057694 A1 * | 10/2000 | ............ A01K 47/06 |
| WO | WO-2022025367 A1 * | 2/2022 | |

\* cited by examiner

AUTOMATIC BEE SEPARATION DEVICE

TECHNICAL FIELD

The present invention relates to an automatic bee separation device, and more specifically, to an automatic bee separation device capable of automatically withdrawing a beehive accommodated in a bee box, performing bee separation at the same time, and when the bee separation is completed, inputting the beehive to the bee box.

BACKGROUND ART

Honey is an excellent natural food which is variously used in a variety of ways, from sweeteners to raw materials of pharmaceuticals and supplements and industrial and cosmetic raw materials, and has excellent taste, aroma, nutrition, and efficacy sufficient to be called a comprehensive nutritional supplement. Generally, honey refers to natural honey obtained through bees.

Beekeeping to obtain the honey is one field of agriculture and is an industry that produces the honey, royal jelly, pollen, and beeswax by keeping bees. The history of Korean beekeeping industry started from the Three Kingdoms period, and the beekeeping is now widely practiced nationwide.

A process of obtaining the honey through the beekeeping is to collect nectar from flowers, which are honey sources, using kept bees and store honey in a beehive, brush and separate the bees through bee separation work, and separate the honey from the beehive using a honey extractor.

Generally, although a worker directly performs the bee separation work through which the bees are brushed and separated from the beehive using a brush, the bee separation work performed by manpower causes a considerable time delay, which lowers the yieldability of honey, and due to the time delay of the bee separation work, honey shipment is delayed, and quality of the honey is degraded. When a large amount of manpower is mobilized in order to solve this problem, an excessive labor cost is incurred, and when personnel other than a beekeeping professional performs the work, there is a risk of an accident such as being stung by the bees during the bee separation work.

In order to solve this problem, in Korean Registration Utility Model No. 20-0460083, a bee separator for honey extraction work including a case in which a driving device accommodation part is formed, a pair of brushes, a brush driving device, a pair of supports, wheels, and a bee collection box has been disclosed. However, in the above-described structure, since a beehive to which bees are attached is withdrawn from a bee box, and the beehive is input to a bee separation device to separate the bees, there are many work processes, a work time is increased, and thus there is a problem in that the productivity is lowered.

DISCLOSURE

Technical Problem

The present invention is directed to providing an automatic bee separation device capable of automatically performing beehive withdrawal work and bee separation work at the same time so that the bee separation work may be simply and quickly performed without requiring a worker to directly and manually withdraw the beehive from the bee box.

In addition, the present invention is directed to providing an automatic bee separation device capable of repeating moving and stopping to sequentially and automatically withdraw beehives accommodated in a bee box and separate bees therefrom.

Technical Solution

One aspect of the present invention provides an automatic bee separation device including a support unit including main frame parts installed around or on a bee box, rail parts provided on the main frame parts, moving units installed to be movable along the rail parts, an entry unit which is installed on the moving units and performs a withdrawal operation of withdrawing beehives accommodated in the bee box to an outside from the bee box and an input operation of inputting the withdrawn beehives to the bee box, a bee separation unit which brushes and removes a bee attached to a surface of the beehive while the beehive is withdrawn from the bee box or the withdrawn beehive is input to the bee box by the entry unit, and a control unit which controls operations of the moving unit, the entry unit, and the bee separation unit to automatically separate the bee from the plurality of beehives.

The automatic bee separation device may further include a beehive rack part on which the beehives, on which bee separation work is completed, are hung at a front or rear side of the entry unit, and a rack moving part which moves the beehive, which is withdrawn from the bee box by the entry unit and on which the bee separation work is completed, to the beehive rack part.

The automatic bee separation device may further include a first blower which is installed in the beehive rack part and supplies wind toward the beehive hung on the beehive rack part from at least any one side of both sides of the beehive in a longitudinal direction.

The automatic bee separation device may further include a second blower which is installed above the beehive rack part and supplies wind in a downward direction toward the beehive hung on the beehive rack part or an inner side of the bee box.

The automatic bee separation device may further include installation control parts which are installed under the main frame parts disposed at both sides of the automatic bee separation device and installed on the main frame parts to be slidably movable in a direction perpendicular to the main frame part so that the pair of main frame parts provided in the support unit to correspond to a size of the bee box are mounted and installed on the bee box.

The automatic bee separation device may further include a gap control part formed to adjust a gap between a pair of operating arms provided on the entry unit to correspond to a size of the beehive.

The bee separation unit of the automatic bee separation device may be installed in the entry unit and include an air supply part which supplies air toward the beehive to blow and remove the bee attached to a surface of the beehive while the beehive is withdrawn from the bee box or the withdrawn beehive is input to the bee box by the entry unit.

Advantageous Effects

According to an automatic bee separation device according to the present invention, since beehive withdrawal work and bee separation work are performed at the same time without requiring a worker to directly and manually withdraw a beehive from a bee box when the bee separation work or honey extraction work is performed after the bee separation work, a speed and efficiency of the work can be maximized in addition to an effect of reducing a labor cost. Therefore, as productivity increases, an effect of increasing income can be generated.

In the automatic bee separation device according to the present invention, since moving and stopping are repeated above the beehives to sequentially and automatically withdraw the beehives accommodated in the bee box, separate bees from the beehive, and input the beehive to the bee box or hang or load the beehive on a beehive rack part, there are advantages in that not only the bee separation work for an entirety of the bee box but also honey extraction work can be smoothly and quickly performed.

In the automatic bee separation device according to the present invention, since injury of the honey bees is minimized using a blower which supplies wind, the bees can be prevented from being injured and pressed to death during a bee separation process, and the loss of the honey bees can be significantly reduced.

In the automatic bee separation device according to the present invention, since overheating of the automatic bee separation device is prevented using the blower which supplies the wind, a cost required for maintenance according to a failure occurrence can be reduced.

In the automatic bee separation device according to the present invention, since a bee box cover part is additionally provided, the bees can be prevented from escaping to the outside of the bee box, and hornets can be prevented from being introduced into the bee box in the bee separation process.

In the automatic bee separation device according to the present invention, since a support unit can be stably mounted and installed on the bee box to correspond to a size of the bee box, and a gap between operating arms which withdraw the beehive can be adjusted to correspond to a size of the beehive, the bee separation work can be smoothly performed regardless of the size thereof.

MODES OF THE INVENTION

Hereinafter, various embodiments of an automatic bee separation device according to exemplary embodiments of the present invention will be described in detail with reference to the accompanying drawings.

Figure 1:
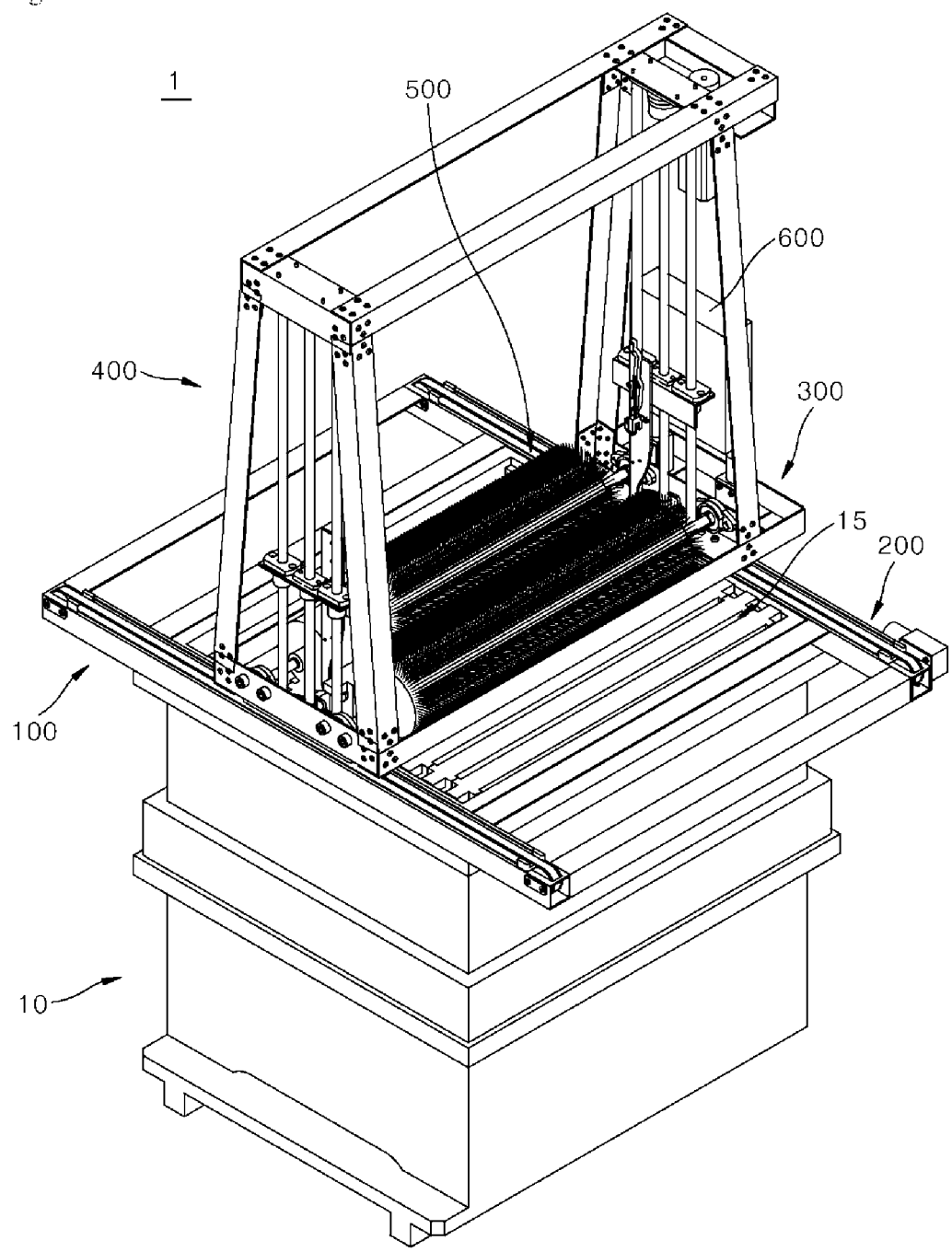
FIG. 1 is a perspective view illustrating an automatic bee separation device according to one embodiment of the present invention.
Figure 2:
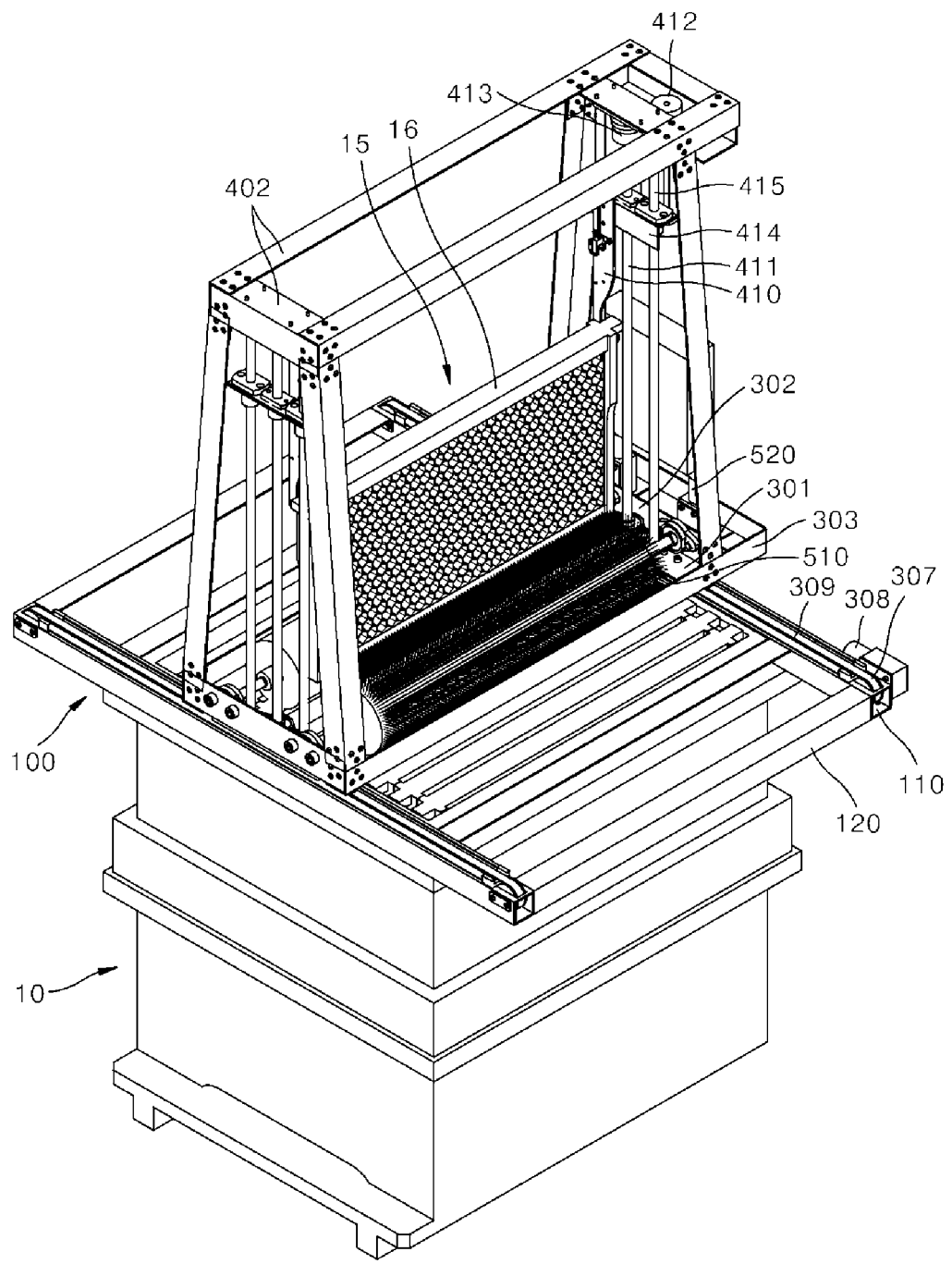
FIG. 2 is a perspective view illustrating an operation state of the automatic bee separation device according to one embodiment of the present invention.
Figure 3:
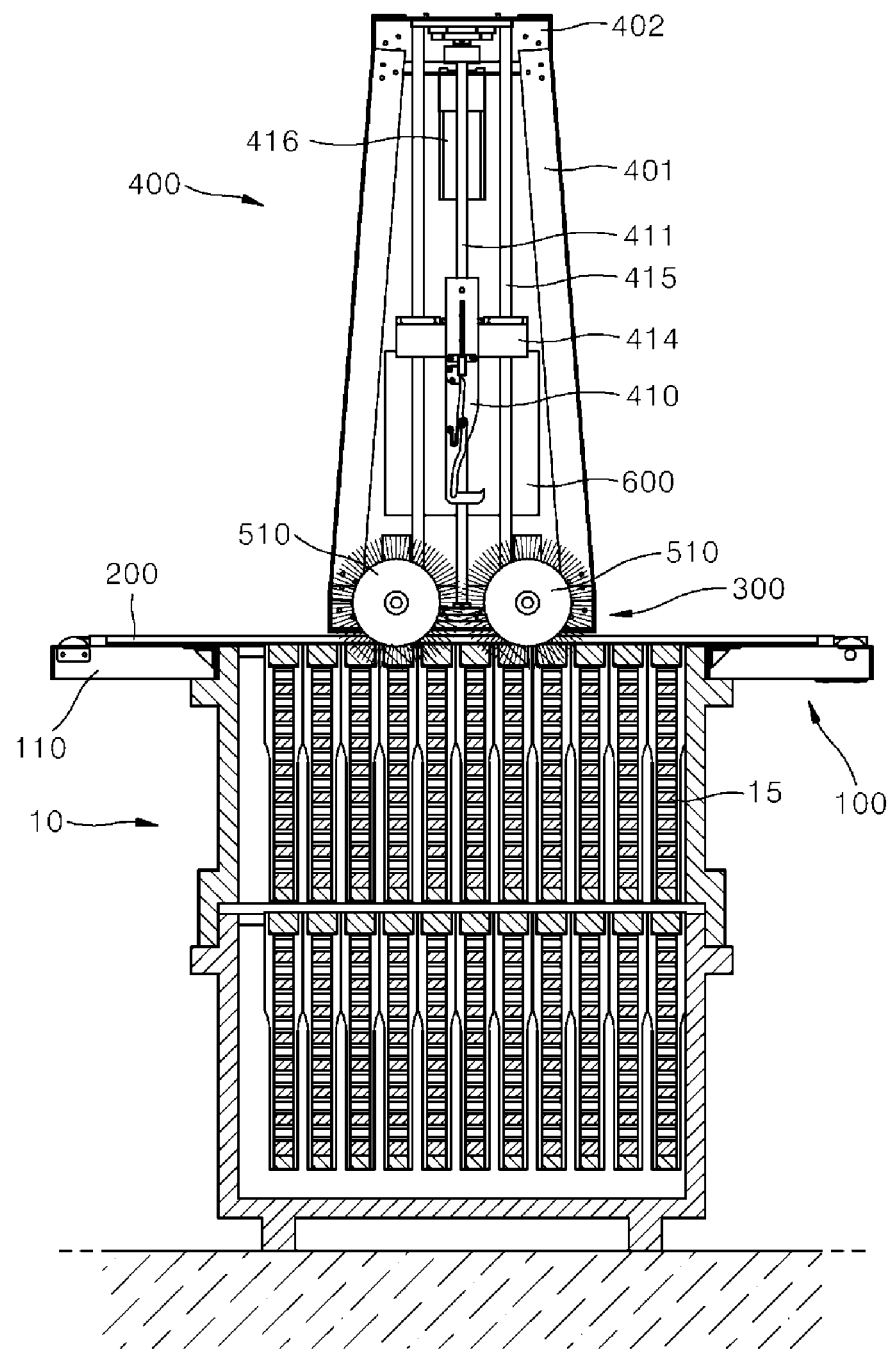
FIG. 3 is a cross-sectional view illustrating the automatic bee separation device according to one embodiment of the present invention.

In FIGS. 1 to 3, an automatic bee separation device 1 according to the present invention is illustrated. Referring to FIGS. 1 to 3, the automatic bee separation device 1 according to the present invention includes a support unit 100, rail parts 200, a moving unit 300, an entry unit 400, a bee separation unit 500, and a control unit 600.

First, before the automatic bee separation device according to the present invention is described, a bee box 10 may be formed of a material such as wood or plastic in a quadrangular shape to keep honey bees, but is not limited thereto, and may also be formed in a circular or hexagonal shape. The bee box 10 includes a body part having a box shape, of which an upper portion is open and in which an accommodation space is provided to accommodate a plurality of beehives 15, and a lid part formed to be detachably coupled to the upper portion of the body part to open or close the accommodation space of the body part.

The support unit 100 is a unit installed around or on the bee box 10 and includes a pair of main frame parts 110 which are seated, mounted, and installed on the bee box 10 and connecting frame parts 120 which connect the main frame parts 110 to each other and reinforce the main frame parts 110 in the present embodiment.

The main frame part 110 is formed of a quadrangular pipe in which a hollow is formed, and the pair of main frame parts 110 are disposed to be parallel to each other and to be spaced apart from each other by a distance greater than a width or length of the bee box 10 to which the beehives 15 are input.

The connecting frame parts 120, which connect the main frame parts 110 disposed at both sides of the connecting frame parts 120, are installed on end portions of both sides of the main frame parts 110 or in middles of the main frame parts 110 in a longitudinal direction. The connecting frame parts 120 connect the main frame parts disposed at both sides of the automatic bee separation device to maintain the same distance between the main frame parts and maintain and reinforce a shape of the support unit.

Unlike the illustrated example, a support unit 100 may also include a pair of main frame parts 110 disposed to be parallel to each other around a bee box 10, connecting frame parts 120 which connect end portions of both sides of the main frame parts 110, and a base support frame part (not shown) which is fixed to the ground surface to support the main frame parts 110 and the connecting frame parts 120 so that the main frame part 110 and the connecting frame part 120 are spaced apart from the ground surface. In addition, a wheel part (not shown) such as a wheel may also be installed under the base support frame part to move the support unit 100 along the ground surface instead of fixing the base support frame part to the ground surface.

The rail parts 200 extend along the main frame parts 110 and are fixedly installed on the pair of main frame parts 110. The rail part 200 has a structure in which a central portion of the rail part 200 in a width direction is recessed downward to form a guide groove and guide protrusions are formed to protrude upward from edges of both sides of the rail part 200 in the width direction.

The moving unit 300 is a unit to be movable along the rail parts 200 and includes a moving frame part installed on the rail parts 200 to be movable along the rail parts 200 and movement driving parts which move the moving frame part along the rail parts 200.

The moving frame part includes sliding blocks coupled to the rail parts 200 to be movable along the rail parts 200, moving plates 301 installed on the sliding blocks and having a flat plate shape, horizontal moving frame parts 302 which are installed on the moving plates 301 to be parallel to the rail parts 200 and on which bee separation brushes 510 are rotatably installed, and an interlocking frame part 303.

The sliding block is coupled to the rail part 200 to cover the guide protrusions provided on upper both sides of the rail part 200 in the width direction to be movable along the rail part 200. The sliding block may also be provided as one sliding block, but the plurality of sliding blocks may be provided to support the moving plate 301, which will be described below, so that the moving plate 301 is spaced upward from the rail part 200 by a predetermined distance.

The moving plate 301 is a plate installed on the sliding block to be movable in a longitudinal direction of the rail part 200 and the main frame part 110 using the sliding block, extends a predetermined length in a direction parallel to the longitudinal direction of the rail part 200 and the main frame part 110, and is formed in a flat plate shape having a predetermined width.

The horizontal moving frame part 302 is a part which rotatably supports the bee separation brush 510 and is fixedly installed on the moving plate 301 in a direction parallel to a longitudinal direction of the moving plate 301.

The interlocking frame part 303 connects the pair of main frame parts 110 and the moving plates 301 which are installed on the rail parts 200 and both sides of the automatic bee separation device according to the present invention so that the moving plates 301 are moved along the main frame parts 110 and the rail parts 200 and is provided as a pair of interlocking frame parts 303. Both ends of the interlocking frame parts 303 are connected to end portions of one facing sides and the other facing sides of the moving plates 301.

The moving frame part has a quadrangular frame structure due to the moving plates 301, the horizontal moving frame parts 302, and the interlocking frame parts 303.

The movement driving part includes a first moving roller 307 and a second moving roller which are rotatably installed on end portions of both sides of the main frame part 110, a movement driving motor 308 which rotates one of the first moving roller 307 or the second moving roller, and a moving belt 309 which is installed on the first moving roller 307 and the second moving roller to rotate in an endless track and to which the sliding block or the moving plate 301 is connected at one point thereof. The movement driving part is installed on each of the main frame parts 110 disposed at both sides of the automatic bee separation device.

The first moving roller 307 and the second moving roller are installed to be rotatable about shafts installed in end portions of both sides of the main frame part 110 in a direction perpendicular to the longitudinal direction of the main frame part 110.

The movement driving motor 308 is installed on any one main frame part 110 of the pair of main frame parts 110 to rotate the first moving roller 307 and the second moving roller, and a reduction gear part is installed between the movement driving motor 308 and the first moving roller 307 or the second moving roller.

The moving belt 309 is installed to pass through the first moving roller 307, the guide groove of the rail part 200, the second moving roller, and the hollow of the main frame part 110 so that the moving belt 309 is rotatable in the endless track due to the first moving roller 307 and the second moving roller.

A timing belt may be applied to the moving belt 309 to stop the moving frame part at an exact position and move the moving frame part to an exact position, in this case, gear members in which gear teeth interfered with the timing belt are formed may be formed on the first moving roller 307 and the second moving roller.

The entry unit 400 is a unit which is installed on the moving unit 300 and may perform a withdrawal operation of withdrawing the beehive 15 accommodated in the bee box 10 to the outside of the bee box 10 and an input operation of inputting the withdrawn beehive 15 to the bee box 10 and includes a support frame part, operating arms 410, and an entry driving part.

The support frame part is installed on the moving frame part to be movable along the rail part 200 together with the moving frame part.

The support frame part includes a pair of extension frame parts 401 of which one sides are connected to end portions of both sides of the moving plate 301 of the moving frame part or end portions of both sides of a linked frame part, and the other sides extend predetermined lengths to be far away, in an upward direction, from the moving frame part and a plurality of reinforcing frame parts 402 which connect the end portions of the extension frame parts 401.

The support frame part has a gantry structure as illustrated and supports installing of the entry driving part which will be described below.

The operating arms 410 are formed to be hooked on the beehive 15, more specifically, hook target parts 15a of the beehive 15, accommodated in the bee box 10 or to grip a frame of the beehive 15.

The operating arms 410 have a structure in which one sides of the operating arms 410 are fixed to moving blocks 414, which will be described below, the other sides extend downward from the moving blocks 414, and hooks are bent in one direction to hook the hooking target parts 15a protruding from both sides of the beehive 15 in a longitudinal direction so as to lift the beehive 15 upward.

In the present embodiment, the operating arms 410 having the hook structure to hook the hooking target parts 15a of the beehive 15 so as to lift the beehive 15 upward is applied, but alternatively, a gripper structure capable of gripping the frame or the hooking target part 15a of the beehive 15 from both sides is applicable.

In a case in which the gripper structure of the operating arms 410 is applied, by gripping the frame or the hooking target parts 15a of the beehive 15 from both sides, the beehive 15 having one of various thicknesses can be withdrawn and input, and bee separation work can also be smoothly performed.

Alternatively, a vacuum adsorption structure of the operating arms 410 capable of withdrawing the beehive 15 from the bee box 10 or inputting the beehive 15 to the bee box 10 may also be applied.

The entry driving part is a part, which is installed between the moving frame part and the support frame part and is connected to the operating arms 410 to move the operating arms 410 into the bee box 10 or move the operating arms 410 in a direction away from the bee box 10 and includes shafts 411, a driving gear 412, a driven gear 413, a first interlocking belt, interlocking sprockets, a second interlocking belt, the moving blocks 414, guide rods 415, and an entry driving motor 416.

Both ends of the shaft 411 are rotatably installed on the support frame part and the moving frame part, and a screw part to which the moving block 414 is screw-coupled is provided on an outer circumferential surface of the shaft 411.

The entry driving motor 416 is a motor which provides power to rotate the shaft 411 and is fixedly installed on the support frame part.

The driving gear 412 is installed on an end portion of a driving shaft of the entry driving motor 416, the driven gear 413 is provided above the shaft 411, and the first interlocking belt connects the driving gear 412 and the driven gear 413 to rotate the driven gear 413 together when the driving gear 412 rotates.

The interlocking sprockets are provided at the shafts 411 disposed at both sides of the automatic bee separation device. In addition, the second interlocking belt connects the interlocking sprockets provided on the shafts 411 disposed at both sides of the automatic bee separation device to rotate the shaft 411 disposed at the other side when the shaft 411 disposed at the one side is rotated by the driving gear 412, the first interlocking belt, and the driven gear 413.

The moving blocks 414 are screw-coupled to the shaft 411 disposed at both sides of the automatic bee separation device, the operating arms 410 are fixedly installed at one sides thereof, and through holes vertically passing through the moving blocks 414 are formed in the moving blocks 414 to allow the guide rods 415 to pass therethrough.

A pair of guide rods 415 are installed around the shaft 411 to be parallel to the shaft 411, both ends thereof are fixed to the extension frame part 401 and the moving frame part, and when the shaft 411 rotates, the moving block 414 is prevented from being rotated with the shaft 411 to guide the moving block 414 to move along the shaft 411.

The bee separation unit 500 is a unit which brushes and removes the bees attached to a surface of the beehive 15 while the beehive 15 is withdrawn from the bee box 10 or the withdrawn beehive 15 is input to the bee box 10 by the entry unit 400 and includes bee separation brushes 510 and bee separation driving parts 520.

The bee separation brushes 510 are rotatably installed on one side and the other side, which are adjacent to both surfaces of the beehive 15 withdrawn from the bee box 10 to the outside, of the moving frame part and are provided as a pair of bee separation brushes 510.

The bee separation driving parts 520 are parts which rotate the bee separation brushes 510 and are installed and fixed on the moving frame part and connected to rotary shafts of the bee separation brushes 510. The bee separation driving part 520 may further include a reduction gear box for reducing a rotation speed of the bee separation brush 510 as illustrated in the drawings.

The control unit 600 controls operations of the moving unit 300, the entry unit 400, and the bee separation unit 500 to automatically separate the bees of the plurality of beehives 15.

The above-described automatic bee separation unit 500 according to the present invention operates according to a process below.

First, in a state in which the lid part of the bee box 10 is removed, in order to lift the beehive 15 upward, the control unit 600 controls the movement driving parts to move the operating arms 410 in a horizontal direction so that the operating arms 410 are positioned in a space between the beehives 15 and controls the entry driving part to vertically move the operating arms 410 so that the operating arms 410 move between the beehives 15.

In addition, the control unit 600 controls the movement driving part to move the operating arms 410 by a predetermined distance in the horizontal direction so that the hooking target parts 15a disposed at both sides of the beehive 15 in the longitudinal direction are hooked on hook parts of the operating arms 410 moved into the bee box 10.

After the hooking target parts 15a of the beehive 15 are hooked on the hooks of the operating arms 410, the control unit 600 controls the entry driving part to vertically lift the operating arm 410 upward to withdraw the operating arms 410 from the bee box 10, and at the same time, controls the bee separation driving part 520 to brush bees, which are attached to the beehive 15 withdrawn from the bee box 10 to the outside by the operating arm 410, off using the bee separation brushes 510.

After the beehive 15 is lifted upward to a predetermined level by the entry driving part, the control unit 600 controls the entry driving part to vertically move the beehive 15 downward so that the beehive 15 may be input to the bee box 10 again. In addition, after the beehive 15 is input to the bee box 10, the control unit 600 moves the operating arms 410 backward and moves the operating arms 410 upward to a predetermined level so that the hooks of the operating arms 410 do not hook the beehive 15.

Next, in order to separate the bees from the beehive 15, the operating arms 410 are horizontally moved by a predetermined distance, and the above-described process may be repeated to automatically and sequentially separate the bees from the plurality of beehives 15 accommodated in the bee box 10 or visually check a state of the beehive.

Figure 4:
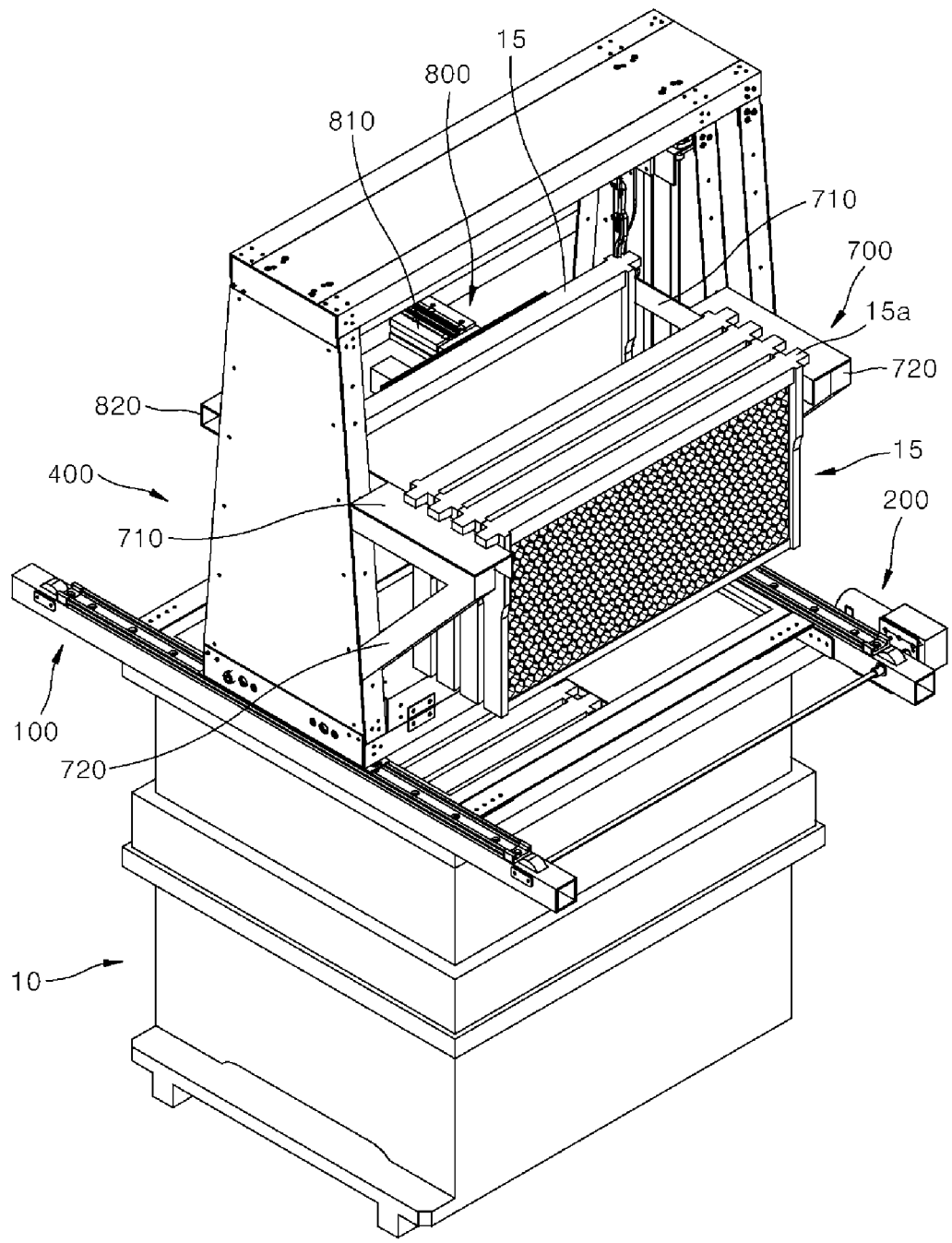
FIG. 4 is a perspective view illustrating an automatic bee separation device further including a beehive rack part and a rack transfer part.
Figure 5:
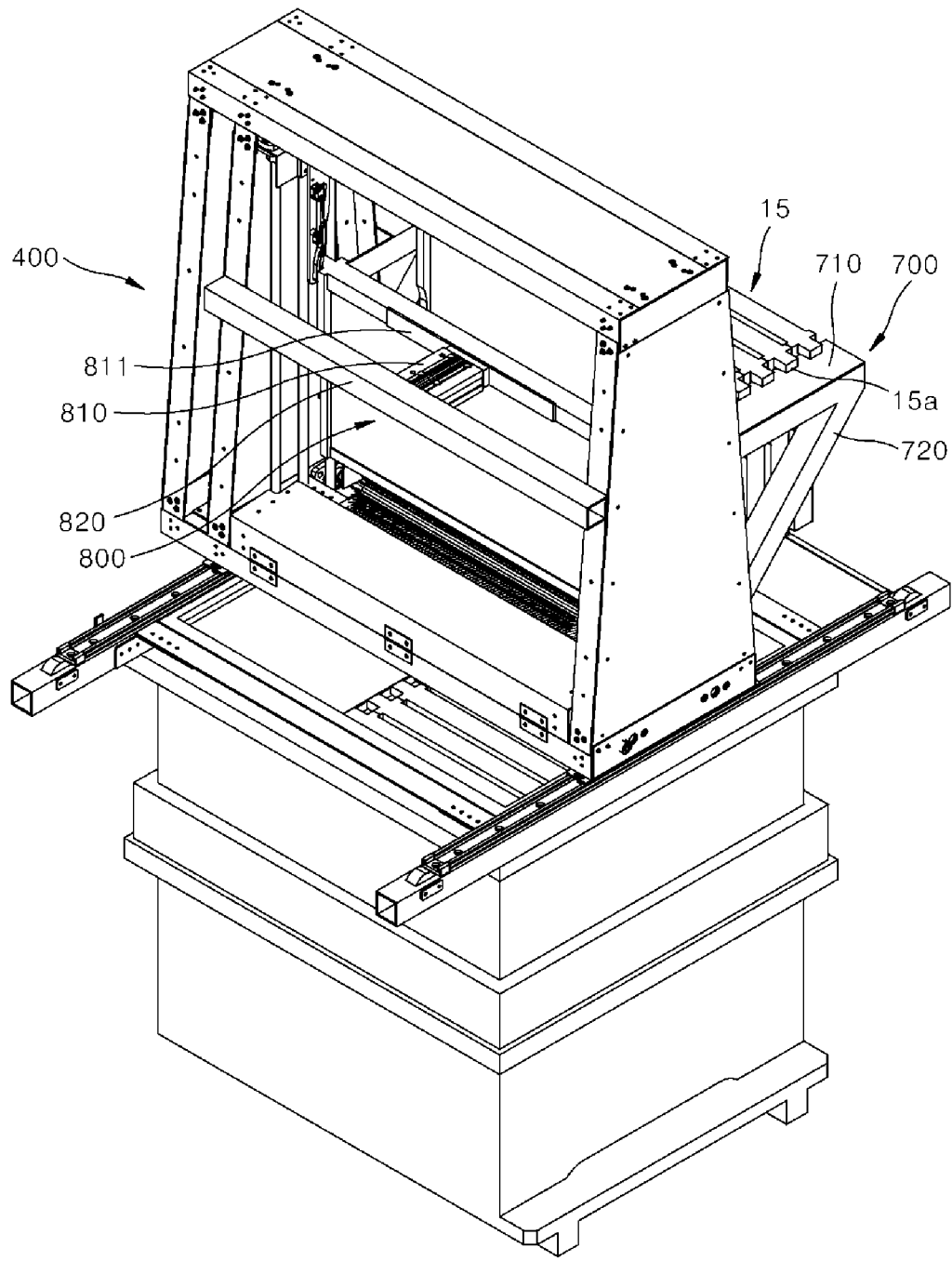
FIG. 5 is a perspective view illustrating an automatic bee separation device further including a beehive rack part and a rack transfer part according to one embodiment beehive.

An automatic bee separation device according to the present invention may further include a beehive rack part 700 and a rack transfer part 800 as illustrated in FIGS. 4 and 5.

Referring to FIGS. 4 and 5, the beehive rack part 700 is a part for holding beehives 15 on which bee separation work is completed by a bee separation unit 500 at the outside of a bee box 10 for honey extraction work instead of inputting the beehives 15 to the bee box and accommodating the beehives 15 in the bee box again and includes a rack 710 and a first support 720. The rack 710 and the first support 720 are provided as a pair of the rack 710 and a pair of first supports 720.

The beehive rack parts 700 may be formed to have a structure and a material capable of supporting a maximum of a weight of 40 kg in a case in which the beehives 15 are loaded thereon.

As illustrated in FIG. 4, the racks 710 extend in a forward or rearward direction of an entry unit 400 in a horizontal direction parallel to rail parts 200 and are disposed to be spaced apart from each other by a distance corresponding to a lateral width of the beehive 15 so that the beehive 15 on which bee separation is completed may be hung on the racks 710.

The racks 710 are disposed inside a support frame part and, more specifically, disposed inside extension frame parts 401 which extend by a predetermined distance upward to move in a direction away from a moving frame part.

The first support 720 is a part for allowing the rack 710 to be supported by the support frame part of the entry unit 400 and is installed to be inclined so that one side thereof is fixed to the extension frame part 401 and the other side is connected to an end portion of the rack 710.

The rack transfer part 800 is a part which moves the beehive 15, which is withdrawn from the bee box by the entry unit 400, to the beehive rack part 700 and includes a rack driving part 810 and a second support 820.

As illustrated in FIG. 5, the rack driving part 810 is a part which is installed in a rearward or forward direction of the entry unit 400 in a direction opposite to the beehive rack part 700 and pushes the beehive 15 on which bee separation work is completed toward the rack 710 to move the beehive 15 to the rack 710, and in the present embodiment, an actuator is applied thereto.

A contact pad 811 is installed on an end portion of the rack driving part 810 to be in contact with a predetermined area of an upper frame of the beehive 15 and stably pushes the beehive 15 out to the rack 710.

The second support 820 is a part for allowing the rack driving part 810 to be supported by the support frame part of the entry unit 400, one end of the second support 820 is fixed to the extension frame part 401 disposed at one side thereof, and the other end thereof is fixed to the extension frame part 401 disposed at the other side thereof so that the second support 820 is installed in the horizontal direction. One side of the rack driving part 810 is fixed to the second support 820.

Figure 6:
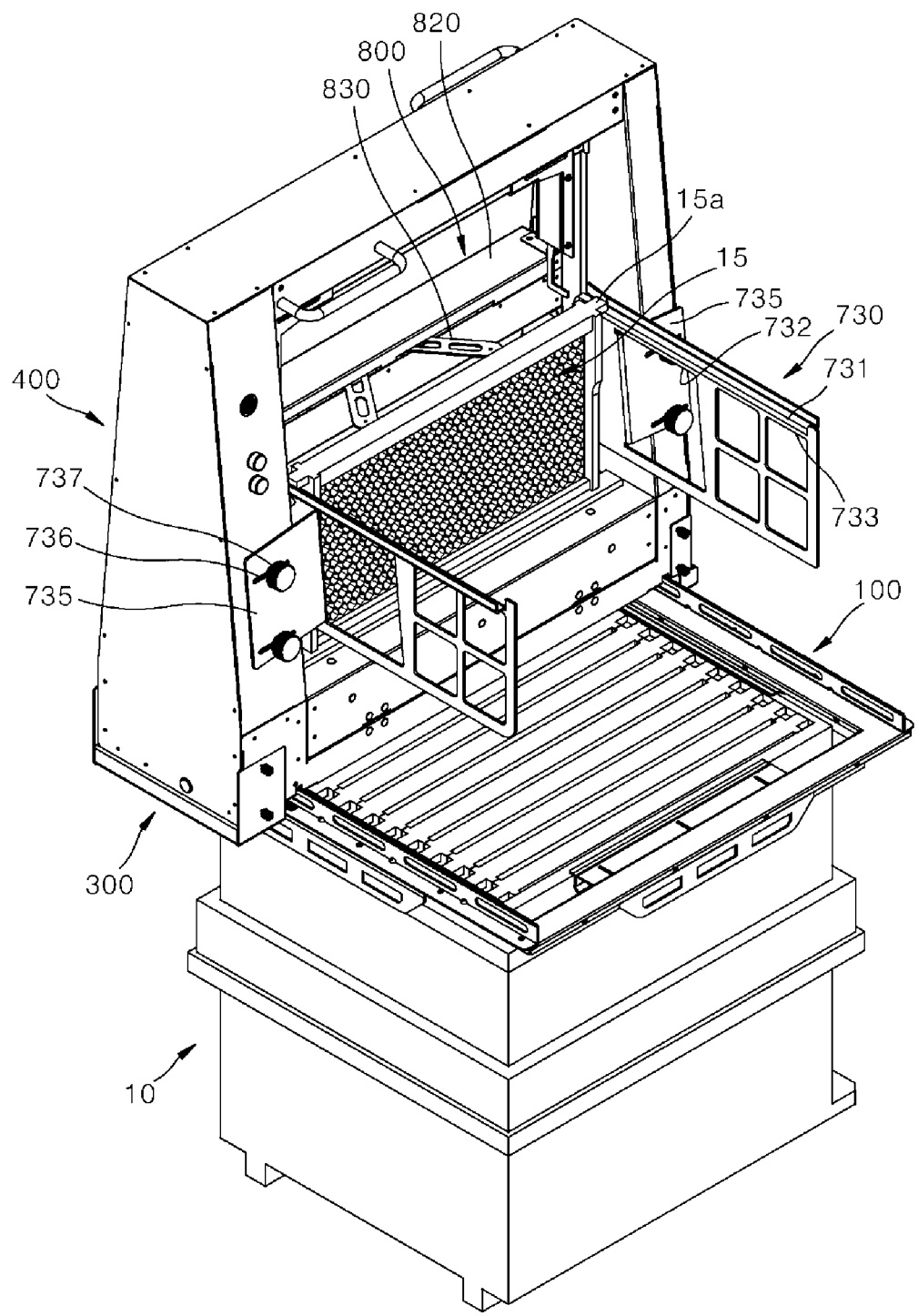
FIG. 6 is a perspective view illustrating an automatic bee separation device further including a beehive rack part and a rack transfer part according to another embodiment.
Figure 7:
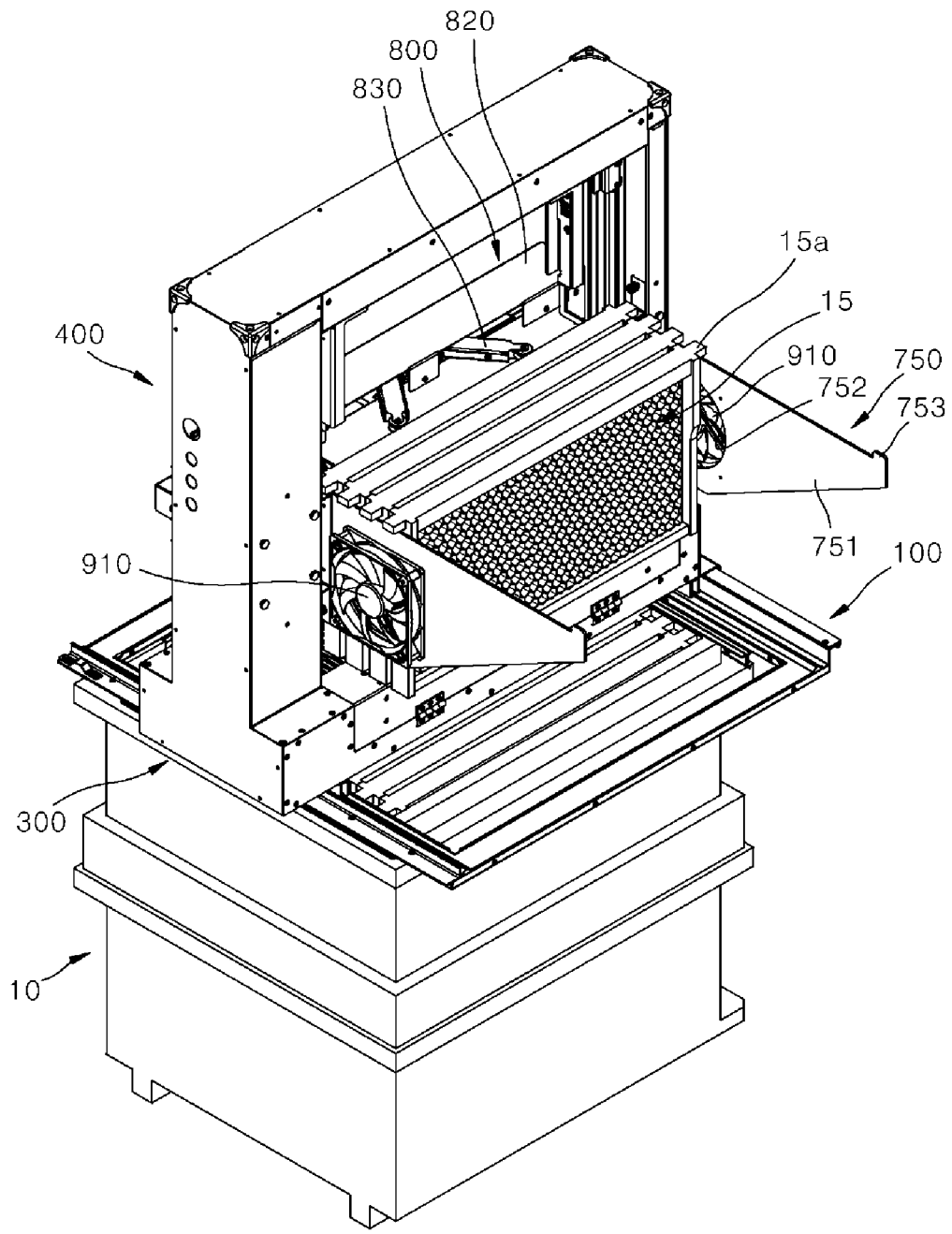
FIG. 7 is a perspective view illustrating an automatic bee separation device further including a beehive rack part and a first blower according to one embodiment.
Figure 8:
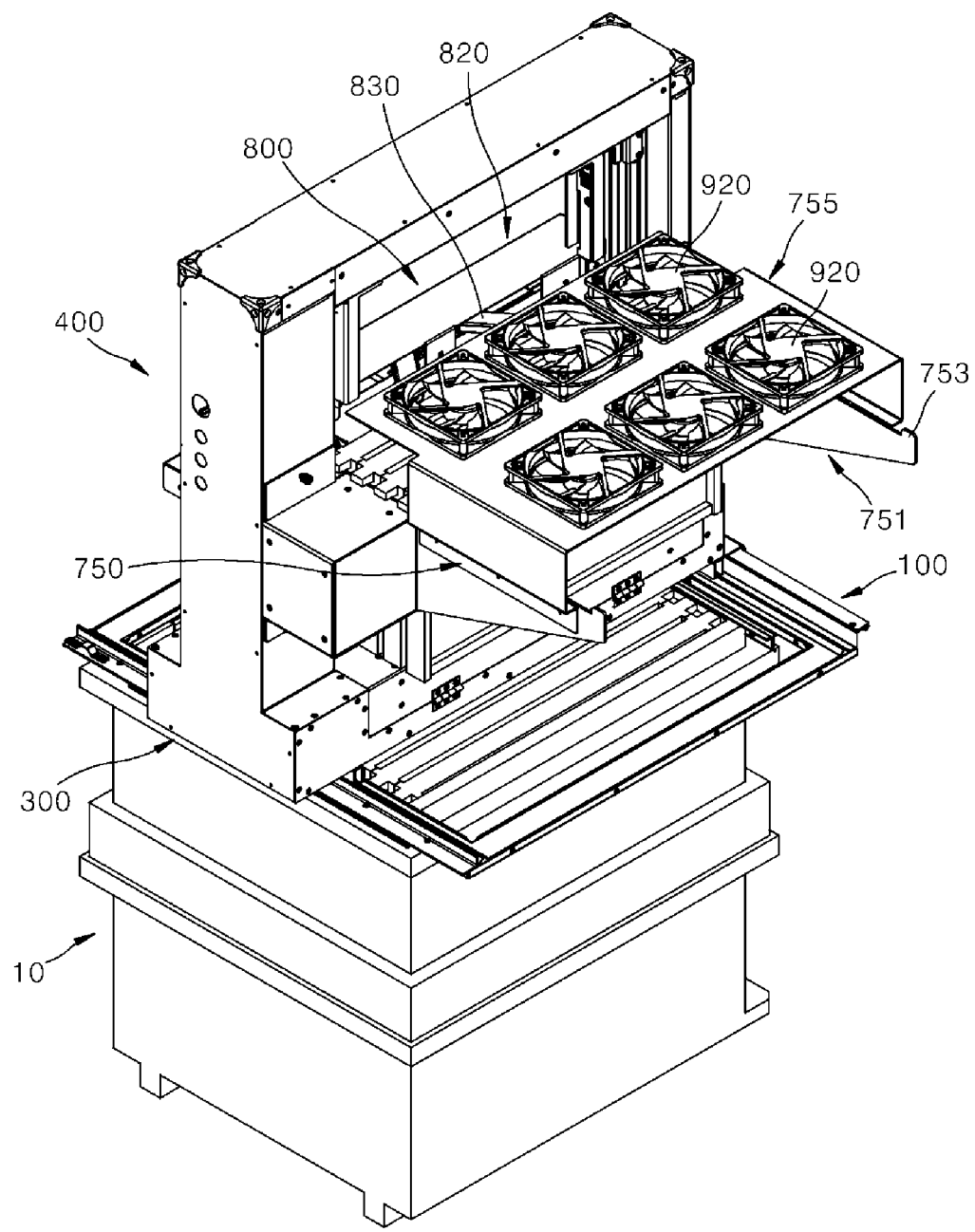
FIG. 8 is a perspective view illustrating an automatic bee separation device further including a beehive rack part and a second blower according to another embodiment.

Besides the actuator of FIGS. 3 to 5, as illustrated in FIGS. 6 to 8, a rack driving part may include a pair of rotating arms 830, which are disposed in a central portion of a second support 820 to be spaced apart from each other by a predetermined distance and of which one ends are rotatably installed on the second support 820 and the other ends are installed to be rotatable toward racks 710 at the same time, and an arm driving motor (not shown) which rotates the rotating arms 830.

As illustrated in FIG. 6, a beehive rack part of an automatic bee separation device according to the present invention may also be provided to adjust a distance to correspond to beehives 15 having different sizes or lengths.

Referring to FIG. 6, a beehive rack part 730 of the automatic bee separation device according to the present invention is a part for holding the beehives 15 outside a bee box 10 for honey extraction work instead of inputting the beehives 15 on which bee separation work is completed by a bee separation unit 500 to the bee box 10 or accommodating the beehives 15 in the bee box 10 and includes rack plates 731 and a position adjustment plates 735.

The rack plate 731 is formed in a quadrangular flat plate shape having a predetermined length, vertically disposed, and installed adjacent to a support frame part corresponding to an inner side of an entry unit 400.

In the rack plate 731, in addition to a cut hole 732 formed due to the position adjustment plate 735, an installation hole 733 may be formed, and a blower fan which provides wind toward the beehive 15 may also be installed in each of the cut hole 732 and the installation hole 733.

The position adjustment plate 735 is a plate which is formed by cutting a portion of the rack plate 731 and bending the portion toward one side and is installed on a support frame part disposed at a front side the entry unit 400.

A plurality of position adjustment slits 736 which have a long hollow shape and extend to have a predetermined length in a horizontal direction are vertically formed in the position adjustment plate 735, and coupling grooves for being coupled to the position adjustment bolts 737 are formed in a front surface of the support frame part on which the position adjustment plate 735 is installed.

The position adjustment plate 735 may be laterally moved with respect to the support frame part in a state in which the position adjustment bolts 737 are loosely unfastened, and when the position adjustment bolts 737 are tightly fastened to the support frame part at a specific position, the position adjustment plate 735 may be fixed to the support frame part.

As described above, since the beehive rack part 730 may adjust a distance between the rack plates 731 by laterally and slidably moving the position adjustment plates 735 with respect to the support frame part, the different beehives 15 having various sizes may be hung and loaded thereon regardless of the sizes or widths of the different beehives 15.

An automatic bee separation device according to the present invention may further include a first blower 910 installed in a beehive rack part.

Referring to FIG. 7, a first blower 910 is a blower which suctions external air and supplies the air to beehives 15 and spaces between the beehives 15 hung on a beehive rack part 750, and a general blower fan may be applied thereto.

Unlike the beehive rack part 700 of FIGS. 1 to 3, the beehive rack part 750 of the automatic bee separation device according to the present embodiment includes support plates 751 of which front ends are fixedly installed on a support frame part to block both sides, in a longitudinal direction, of beehives 15 hung on the beehive rack part 750 and terminal ends extend in horizontal and vertical directions parallel to a longitudinal direction of rail parts 200 and main frame parts 110.

The support plates 751 are formed as a pair of support plates 751, and installation holes 752 in which first blowers 910 are installed are formed in the support plates 751. The number and sizes of the installation holes 752 may be changed according to the number and sizes of the first blowers 910 installed in the support plates 751.

According to the embodiment, upper end portions of the support plates 751 may be formed to be inclined downward in a direction toward the terminal ends so that the plurality of beehives 15 on which bee separation is completed are easily loaded on the support plates 751.

Hooking steps 753 are formed to protrude upward from the terminal ends of the support plates 751 and interfere with the beehives 15 sequentially loaded on the support plates 751 to prevent the beehives 15 from escaping and falling from the support plates 751.

An automatic bee separation device according to the present invention may further include second blowers 920 installed above a beehive rack part 750.

Referring to FIG. 8, the second blowers 920 are blowers which suction external air and supply wind to beehives 15 hung on the beehive rack part 750 and into a bee box 10 under the beehives 15, and general blower fans may be applied thereto.

A pair of support plates 751 which are the same as those of the beehive rack part 750 applied to FIG. 6 are applied to the beehive rack part 750 of the automatic bee separation device according to the embodiment.

The support plates 751 are provided as a pair of support plates 751, and installation holes 752 in which first blowers 910 are installed are formed in the support plates 751. The number and sizes of the installation holes 752 may be changed according to the number and sizes of the first blowers 910 installed in the support plates 751.

According to the embodiment, upper end portions of the support plates 751 may be formed to be inclined downward in a direction toward terminal ends so that the plurality of beehives 15 on which bee separation is completed are easily loaded on the support plates 751.

Hooking steps 753 are formed to protrude upward from the terminal ends of the support plates 751 and interfere with the beehives 15 sequentially loaded on the support plates 751 to prevent the beehives 15 from being separated and falling from the support plates 751.

An upper plate part 755 is installed above the support plates 751 to cover upper portions of the beehives loaded on the support plates 751, and second blowers 920 are installed in the upper plate part 755.

The upper plate part 755 extends in a horizontal direction to correspond to a length of the support plates 751 and is formed in a flat plate shape. Installation holes in which the second blowers 920 may be installed are formed in the upper plate part 755. The number and sizes of the installation holes may be changed according to the number and sizes of the second blowers 920 installed in the upper plate part 755.

The upper plate part 755 may be disposed to be spaced a predetermined level from the beehive 15 loaded and hung on the support plate 751.

In FIGS. 7 and 8, although the structure in which only the first blowers are installed and the structure in which only the second blowers are installed are illustrated, alternatively, the first blowers 910 and the second blowers 920 may also be installed in each of the support plates 751 and the upper plate part 755.

In the automatic bee separation device according to the present invention including the first blowers 910 and the second blowers 920, bees may be efficiently separated from the beehives 15 to minimize the bees from being injured and pressed to death so that loss of the honey bees can be reduced. In addition, the first blower 910 and the second blower 920 can prevent overheating of the automatic bee separation device so that a cost required for maintenance according to a failure occurrence may be reduced.

In addition, the first blowers 910 and the second blowers 920 provided at lateral sides and an upper side of the automatic bee separation device can improve a working environment of a worker so that stability can be maintained from dangers such as burns when the worker work is performed at high temperatures.

Figure 9:
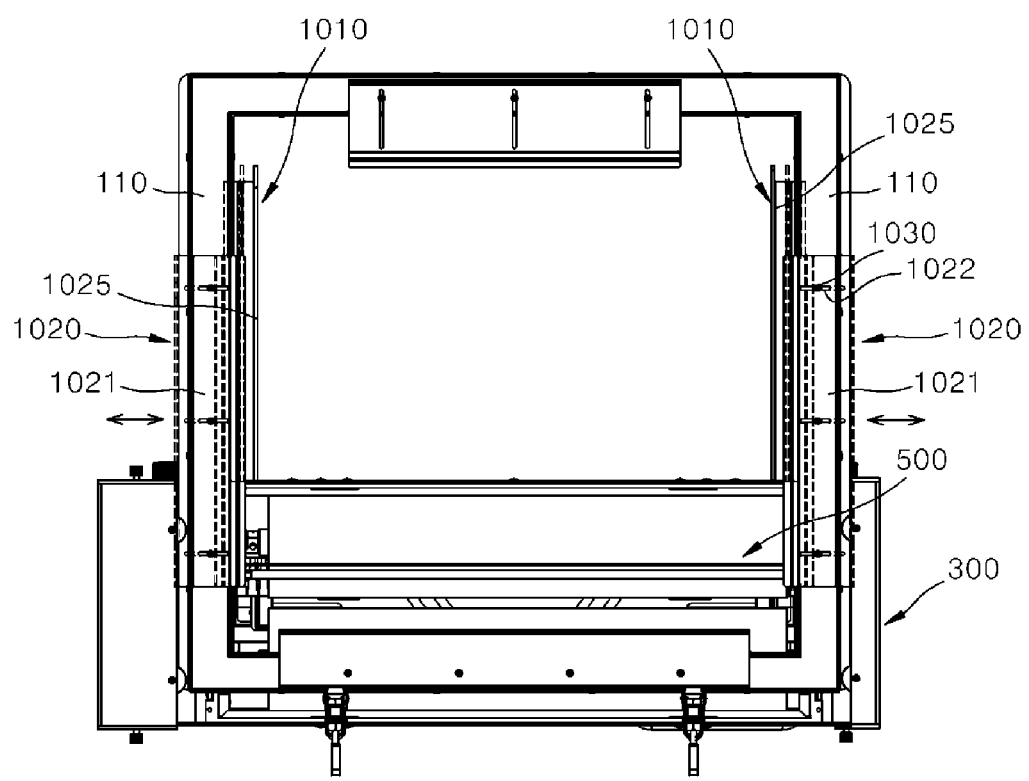
FIG. 9 is a perspective view illustrating an automatic bee separation device further including a gap control part according to one embodiment.

As illustrated in FIG. 9, an automatic bee separation device according to the present invention may further include installation control parts 1010 which are installed below main frame parts disposed at both sides of the automatic bee separation device so that a pair of main frame parts provided on a support unit 100 corresponding to a size and a length of a bee box 15 are stably mounted and installed on the bee box and installed on the main frame parts to be slidably movable in a direction perpendicular to the main frame parts.

Referring to FIG. 9, the installation control parts 1010 include gap adjustment brackets 1020, which are installed under the main frame parts, and gap adjustment bolts 1030.

The gap adjustment brackets 1020 are brackets which are formed in a "┐" shape and provided as a pair of gap adjustment brackets 1020 to be installed on the main frame parts disposed at both sides of the automatic bee separation device.

The gap adjustment brackets 1020 include close contact plate parts 1021 pressed against bottom surfaces of the main frame parts and side plate parts 1025 which extend downward to have predetermined lengths from the close contact plate parts 1021.

In the gap adjustment brackets 1020, the side plate parts 1025 are disposed to face an outer side of the automatic bee separation device according to the present invention, and the close contact plate parts 1021 are disposed to face an inner side of the automatic bee separation device. Accordingly, upper surfaces of the close contact plate parts 1021 are pressed against the bottom surfaces of the main frame parts, and bottom surfaces of the close contact plate parts 1021 are pressed against an upper end of the bee box 10. In addition, one surface of the side plate part 1025 is pressed against or is in contact with one surface of the bee box 10.

A gap adjustment slit 1022 having a long hollow is formed in the close contact plate part 1021 in a width direction of the main frame part or in a direction perpendicular to a direction in which the main frame part extends.

In addition, the gap adjustment bolt 1030 is coupled to the bottom surface, on which the close contact plate part 1021 is installed, of the main frame part by passing through the gap adjustment slit 1022 of the close contact plate part 1021 so that the gap adjustment bolt 1030 is coupled to the main frame part.

Since a gap between the gap adjustment brackets 1020 installed under the main frame parts may be easily adjusted using the installation control parts 1010, in a case in which a gap between the main frame parts disposed at both sides of the automatic bee separation device may not be adjusted according to a size of the bee box 10, the gap adjustment brackets 1020 may be moved in a direction away from or toward each other to correspond to the size of the bee box and fixed to the main frame parts, and thus the main frame parts can be stably seated, mounted, and installed on the bee box 10.

Figure 10:
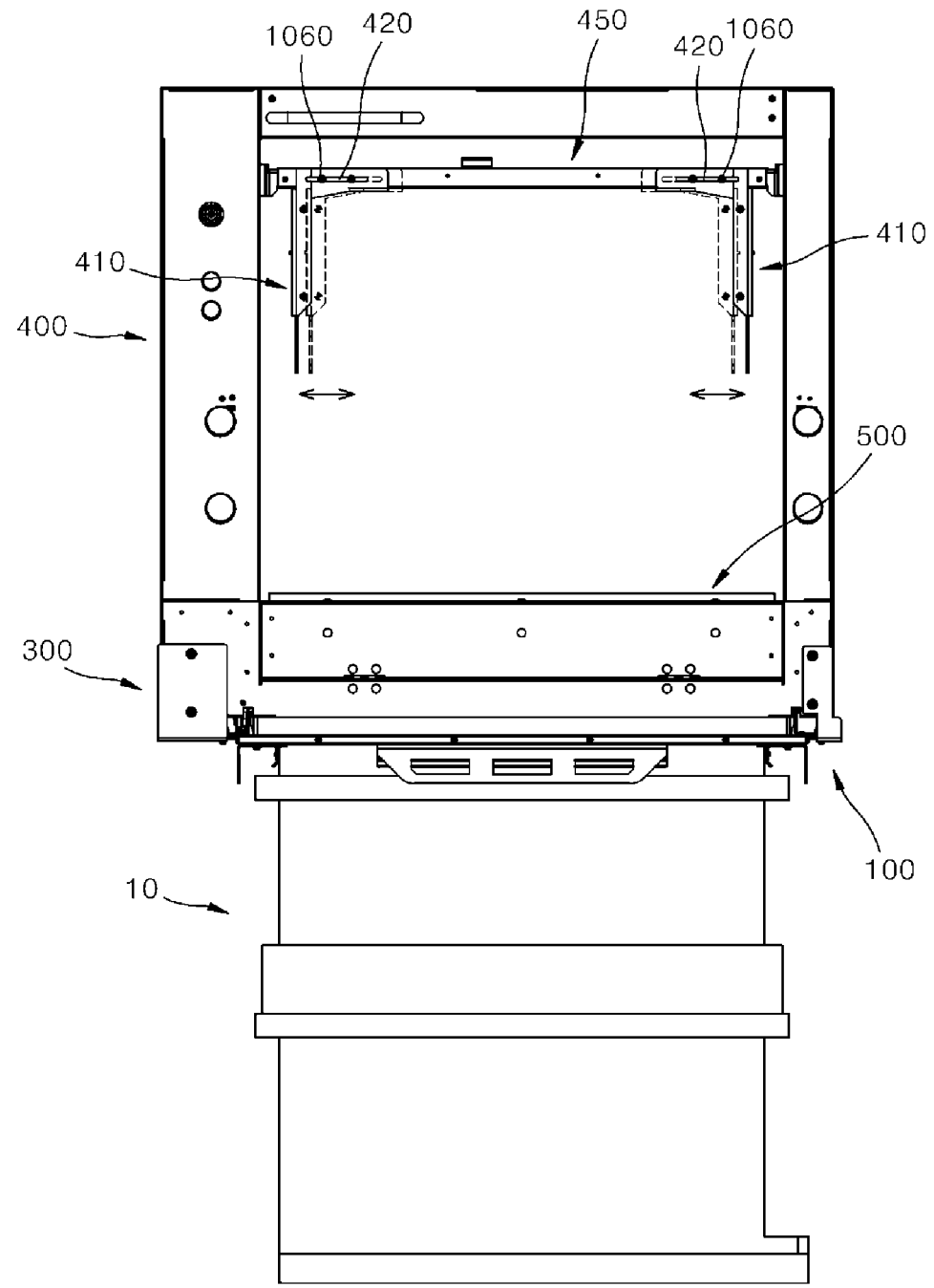
FIG. 10 is a bottom view illustrating an automatic bee separation device further including an installation control part according to one embodiment.

As illustrated in FIG. 10, an automatic bee separation device according to the present invention may further include a gap control part 1050 formed to adjust a gap between a pair of operating arms 410 provided in an entry unit 400 to correspond to a size of a beehive 15.

Referring to FIG. 10, a lift frame part 450 connecting moving blocks disposed at both sides of the lift frame part 450 are further provided in the entry unit 400 of the automatic bee separation device according to the present invention in order to form the gap control parts 1050.

One end of the lift frame part 450 is connected to the moving block disposed at one side of the lift frame part 450, and the other end thereof is connected to the moving block disposed at the other side thereof so that the lift frame part 450 connects the moving blocks which are disposed to be vertically movable along shafts which are disposed at both sides of the lift frame part 450 and provided in the entry unit 400. The lift frame part 450 is horizontally installed, and operating arms 410, which are described above, are detachably installed at end portions of both sides of the lift frame part 450 in a longitudinal direction.

The gap control part 1050 includes gap adjustment bolts 1060 screw-coupled to the lift frame part 450 to fix the operating arms 410 to end portions of both sides of the lift frame part 450 and gap adjustment slits 420 which are formed in upper portions of the operating arms 410 installed on the lift frame part 450 in a horizontal direction parallel to the lift frame part 450 and have long hollows so that the gap adjustment bolts 1060 pass through the gap adjustment slits 420.

In the gap control part 1050, the operating arms 410 may be moved in the longitudinal direction of the lift frame part 450 with respect to the lift frame part 450 according to a size, that is, a length, of the beehive 15 so that the gap between the operating arms 410 installed at end portions of both sides of the lift frame part 450 can be adjusted by increasing or decreasing the gap, and positions of the operating arms 410 can be fixed by coupling the gap adjustment bolts 1060 thereto.

Unlike the bee separation unit 500 using the bee separation brush 510 illustrated in FIGS. 1 to 3, a bee separation unit including an air supply part 560 through which air is supplied to a beehive 15 while the beehive 15 is withdrawn from a bee box 10 to remove bees attached to a surface of the beehive 15 may also be applied to an automatic bee separation device according to the present invention.

Figure 11:
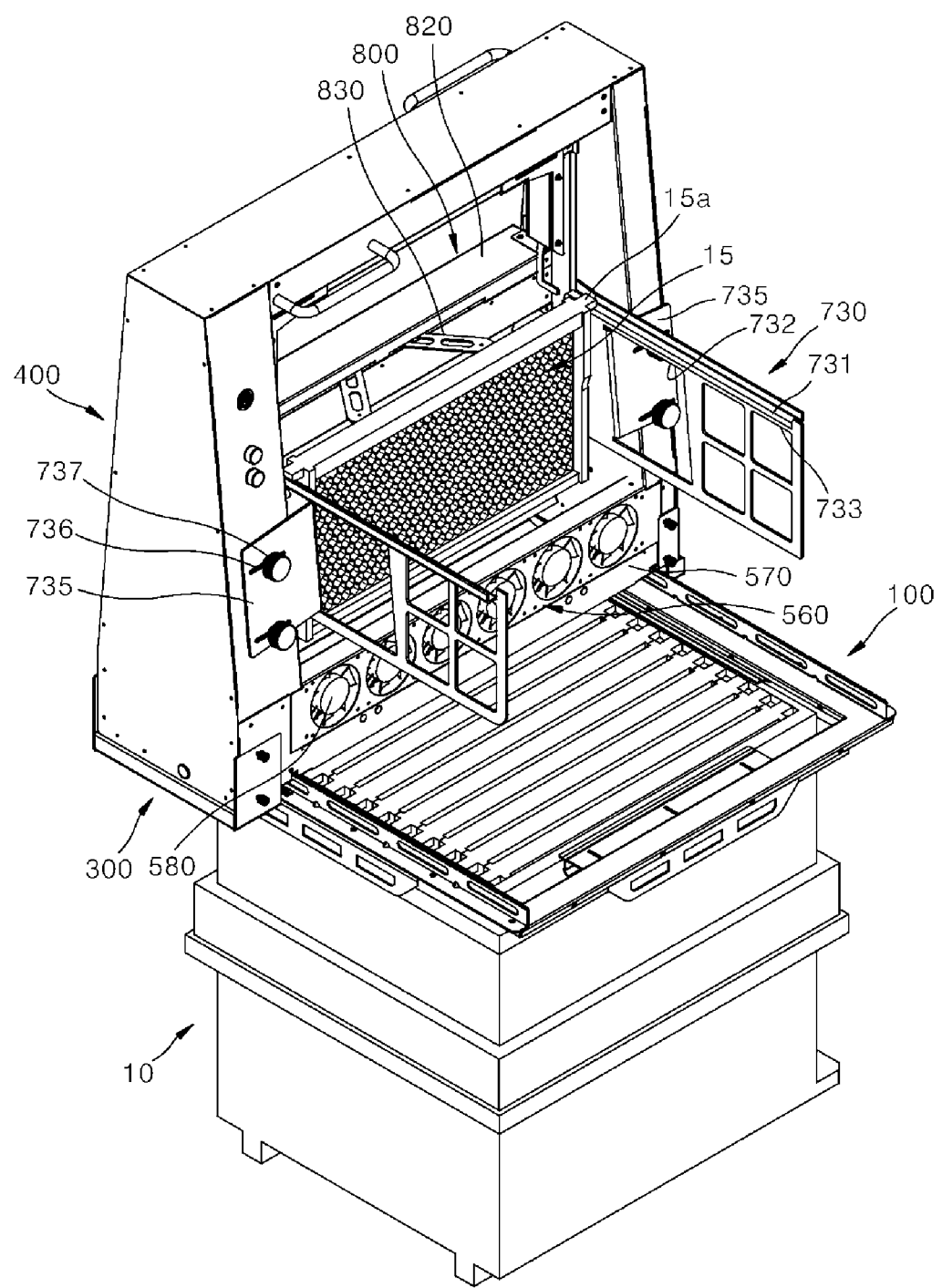
FIG. 11 is a perspective view illustrating an automatic bee separation device including a bee separation unit according to another embodiment.

Referring to FIG. 11, the air supply part 560 includes installation plates 570 which are installed on a moving frame part of a moving unit and a support frame part of an entry unit to face in forward and rearward directions of an entry unit 400 with respect to the beehive 15 withdrawn from a bee box 10 by the entry unit 400 and has quadrangular flat plate shapes and one or more blower fans 580 installed in each of the installation plates 570.

The installation plates 570 are provided as a pair of the installation plates 570 and installed in a horizontal direction on the moving frame part of the moving unit or the support frame part of the entry unit 400 to correspond to a forward direction and a rearward direction of the entry unit 400. Installation holes, in which one or more blower fans 580 may be formed, are formed in the installation plate 570. The number and sizes of the installation holes formed in the installation plate 570 may be changed according to the number and sizes of the blower fans 580.

A structure, in which air is sprayed and supplied from one side and the other side, which face the beehive 15, of the air supply part 560 while the beehive 15 is withdrawn, is applied to the bee separation unit having the air supply part 560, and thus the bee separation unit having the air supply part 560 may easily blow and remove bees attached to the surface of the beehive 15 without injuring the bees when compared to the structure in which the rotary type brush is used.

Meanwhile, although not illustrated in drawings, an automatic bee separation device according to the present invention may further include bee box cover parts, which cover an open upper portion of a bee box 10 of which a lid is opened and prevent bees attached to a beehive 15 in the bee box 10 from flying to the outside of the bee box 10, at edges of both sides of a moving frame part.

The bee box cover part has a width corresponding to a width or length of the bee box 10 or a distance between rails part 200 and is formed in a quadrangular plate shape having a length to cover an upper portion of the bee box 10 even in a case in which the moving frame part moves to an edge of the bee box 10. In addition, one side of the bee box cover part is rotatably installed on the edge of the moving frame part in a vertical direction.

The bee box cover part may be formed to extend in a horizontal direction parallel to the rail parts 200 at a front or rear side of a bee separation unit 500 to correspond to a moving direction of the bee separation unit in order to block a moving path of bees.

For example, the bee box cover part covers an open upper portion of the bee box 10, of which a lid part is opened, at the edges of both sides of the moving frame part to prevent the bees attached to the beehive 15 in the bee box 10 from flying to the outside of the bee box 10.

More specifically, the bee box cover part may have the width corresponding to the width or length of the bee box 10 or the distance between the rail parts 200 and may be formed in the quadrangular plate shape having the length to cover the upper portion of the bee box 10 even in the case in which the moving frame part moves to the edge of the bee box 10. In this case, the bee box cover part may be formed of a light material such as an acrylic material, but is not limited thereto, and may also be formed of one of various materials such as an iron plate, cloth, and wood having a plate shape.

The bee box cover part may be formed to be detachable and attachable, and thus a bee box cover part formed of one of various materials and having one of various sizes may be replaced to correspond to a situation. In addition, in a case in which a bee separation brush 510 rotates, the bee box cover part may be formed at each of front and rear sides of the bee separation brush 510 according to a moving direction of a moving frame.

The bee box cover part may prevent reduction of an amount of honey which occurs due to escaping of the bees from the bee box 10. In addition, hornets can be prevented from being introduced into the bee box 10.

The above-described automatic bee separation device according to the present invention present invention has been described with reference to the accompanying drawings, but these are only examples. It will be understood by those skilled in the art that various modifications and equivalent other example embodiments may be made. Therefore, the scope of the present invention is defined by the appended claims.

The invention claimed is:

1. An automatic bee separation device comprising:
a support unit including a pair of main frame parts installed around or on a bee box;
rail parts provided on the main frame parts;
moving units installed to be movable along the rail parts;
an entry unit which is installed on the moving units and performs a withdrawal operation of withdrawing hive frames accommodated in the bee box to an outside from the bee box and an input operation of inputting the withdrawn hive frames to the bee box;
a bee separation unit which is configured to brush and remove a bee attached to a surface of the hive frame while the hive frame is withdrawn from the bee box or the withdrawn hive frame is input to the bee box by the entry unit;
and a control unit which controls operations of the moving unit, the entry unit, and the bee separation unit to automatically separate the bee from the plurality of hive frames,
installation control parts which are installed under the main frame parts disposed at both sides of the automatic bee separation device so that the pair of main frame parts provided on the support unit corresponding to a size and a length of the bee box are stably mounted and installed on the bee box, and installed on the main frame parts to be slidably movable in a direction perpendicular to the main frame parts, and
wherein the installation control parts comprises;
a pair of gap adjustment brackets including close contact plate parts pressed against a bottom surface of the main frame parts and each gap adjustment bracket provided with a gap adjustment slit having a long hollow, and side plate parts which extend downward to have predetermined lengths from the close contact plate parts; and a gap adjustment bolt coupled to the bottom surface of the main frame part, on which the close contact plate part is installed, by passing through the gap adjustment slit of the close contact plate part so that the gap adjustment bolt is coupled to the main frame part.

2. The automatic bee separation device of claim 1, further comprising:
 a hive frame rack part on which the hive frames, on which bee separation work is completed, are hung at a front or rear side of the entry unit; and
 a rack transfer part which moves the hive frame, which is withdrawn from the bee box by the entry unit and on which the bee separation work is completed, to the hive frame rack part.

3. The automatic bee separation device of claim 2, further comprising a first blower which is installed in the hive frame rack part and supplies wind toward the hive frame hung on the hive frame rack part from at least any one side of both sides of the hive frame in a longitudinal direction.

4. The automatic bee separation device of claim 2, further comprising a second blower which is installed above the hive frame rack part and supplies wind in a downward direction toward the hive frame hung on the hive frame rack part or an inner side of the bee box.

5. The automatic bee separation device of claim 1, further comprising a gap control part formed to adjust a gap between a pair of operating arms provided on the entry unit to correspond to a size of the hive frame.

6. The automatic bee separation device of claim 1, wherein the bee separation unit is installed in the entry unit and includes an air supply part which is configured to supply air toward the hive frame to blow and remove the bee attached to a surface of the hive frame while the hive frame is withdrawn from the bee box or the withdrawn hive frame is input to the bee box by the entry unit.

* * * * *